United States Patent [19]
Fales

[11] 3,850,196
[45] Nov. 26, 1974

[54] METERING ROD WITH POSITION INDICATING MEANS

[75] Inventor: Douglas I. Fales, Flint, Mich.

[73] Assignee: General Motors Corporation, Detroit, Mich.

[22] Filed: Nov. 5, 1973

[21] Appl. No.: 412,574

[52] U.S. Cl. .............................. 137/554, 251/129
[51] Int. Cl. .................. F16k 31/04, F16k 37/00
[58] Field of Search .. 251/129; 137/625.61, 625.65, 137/554; 91/361, 459

[56] References Cited
UNITED STATES PATENTS

| | | | |
|---|---|---|---|
| 2,904,075 | 9/1959 | Markson | 137/625.63 X |
| 2,959,191 | 11/1960 | Schuman et al. | 137/625.61 |
| 3,015,768 | 1/1962 | Hornfelk et al. | 137/487.5 X |

FOREIGN PATENTS OR APPLICATIONS

| | | | |
|---|---|---|---|
| 1,240,632 | 8/1960 | France | 137/625.65 |

Primary Examiner—Arnold Rosenthal
Attorney, Agent, or Firm—Robert M. Sigler

[57] ABSTRACT

A valve includes a fluid flow passage in a case intersected by a bore containing a metering rod positioned by a rod-mounted driving coil interacting with a fixed magnet in the case. A linear differential transformer having coils moving with the rod and a fixed slug is electrically driven by an oscillator to produce a rod position error voltage to modify a rod positioning voltage applied to the driving coil.

3 Claims, 2 Drawing Figures

PATENTED NOV 26 1974　　　　　　　　　　　　　　　　　3,850,196

METERING ROD WITH POSITION INDICATING MEANS

SUMMARY OF THE INVENTION

My invention relates to metering valves and particularly to such a valve having fast accurate response to a valve positioning voltage that would be useful in metering fuel to a vehicle mounted engine. The valve includes in one body an axially reciprocable metering rod, a driving coil attached to the rod for interaction with a fixed permanent magnet to position the rod and a linear differential transformer having coils moving with the rod and a fixed slug to generate a metering rod position error signal. The valve is used with circuitry which sums the rod error signal voltage with an external signal voltage and applies the resulting rod positioning voltage to the driving coil. Further details and advantages of my invention will be apparent from the drawings and the following description of a preferred embodiment.

DESCRIPTION OF A PREFERRED EMBODIMENT

Figure 1:
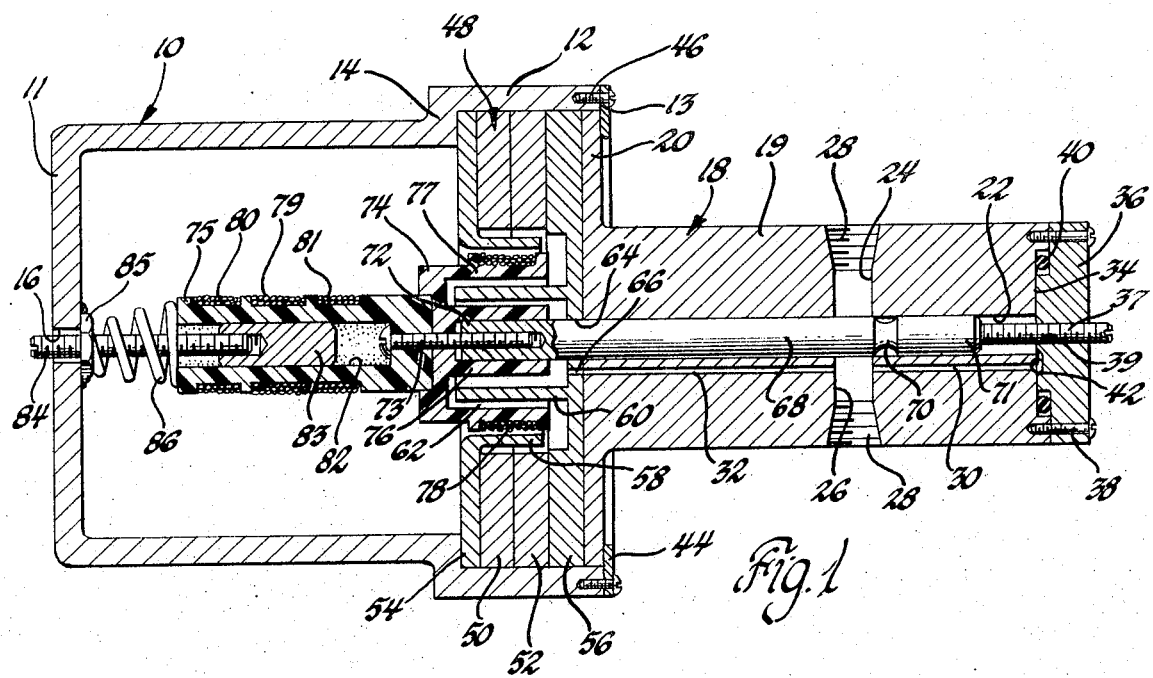
FIG. 1 shows a cutaway view of the valve of my invention.

Referring to FIG. 1, a cylindrical case member 10 has a closed end 11. The cylindrical case member 10 is made of a non-magnetically responsive metal such as bronze and has a cylindrical portion 12 of greater diameter adjacent an open end 13 thereof joined to the remainder thereof by a flange 14. The member 10 is also provided with a small opening 16 axially positioned and aligned in the closed end thereof.

A valve case member 18 comprises a cylindrical block 19 of a light metal such as aluminum of smaller diameter than the cylindrical case member 10 with a flange 20 at one end of diameter great enough to fit snugly in the cylindrical portion 12 of the cylindrical case member 10. The valve case member 18 has an axial bore 22 therethrough and inlet and outlet passages 24 and 26 extending radially outward from a point along said bore 22 to define a fluid flow passage through the valve case member 18. The inlet and outlet passages 24 and 26 are each provided with a threaded portion 28 for the attachment of fluid flow conduits thereto. The valve case member 18 also has fluid drain passage 30 and 32 open to the outlet passage 26 and extending therefrom in each axial direction to the axial ends of the valve case member 18.

The unflanged end 34 of the valve case member 18 is closed by an end cap 36, also made of a light metal such as aluminum and attached to the valve case member 18 by a plurality of bolts 38. An annular sealing member 40 of some flexible material is squeezed between the valve case member 18 and the end cap 36. An indentation 42 on the inner side of the end cap 36 is arranged to open the fluid drain passage 30 to the axial bore 22. A setscrew 37 in a threaded opening 39 in end cap 36 projects into the bore 22 and is axially adjustable from the outside of the end cap 36.

The valve case member 18 is assembled axially to the cylindrical case member 10 with the flange 20 of the valve case member 18 retained within the cylindrical portion 12 of the cylindrical case member 10 by a retaining ring 44 fastened to the cylindrical portion 12 by a plurality of bolts 46. Of course an alternative method of retaining the flange 20 within the cylindrical portion 12 which could be used is to form part of the cylindrical portion 12 at its open end with a smaller wall thickness and crimp this portion radially inward around the flange 20.

The cylindrical portion 12 contains a magnet assembly 48 fixed between the flange 20 of the valve case member 18 and the flange 14 of the cylindrical case member 10. The magnet assembly 48 comprises annular permanent magnets 50 and 52 held between flux members 54 and 56, which are made of a magnetically permeable material such as iron. The flux members 54 and 56 are formed with co-axial cylindrical portions 58 and 60, respectively, to concentrate the magnetic flux of the magnet assembly 48 through an annular air gap 62 contained between said cylindrical portions 58 and 60. The flux member 56 further has an axial opening 64 aligned with the axial bore 22 and a drain passage 66 aligned with the drain passage 32.

A metering rod 68 is reciprocable within the axial bore 22, most of the metering rod 68 being almost as large in diameter as the axial bore so as to normally block fluid flow between the inlet and outlet passages 24 and 26. The metering rod 68, however, has a reduced diameter portion 70 which allows a controlled fluid flow between the inlet and outlet passages 24 and 26 when moved between these passages. The relationship between fluid flow through the fluid flow passage and the axial position of the metering rod 68 can, of course, be changed to fit the needs of a particular application by a variation in the precise size and shape of the reduced diameter portion 70. The precise relationship chosen is irrelevant to my invention. In this embodiment the reduced diameter portion 70 is placed near an end 71 of the metering rod 68 just beyond the fluid flow passage in the direction of the end cap 36.

The other end 72 of the metering rod 68 projects beyond the axial bore 22 and axial opening 64 and has attached thereto by a bolt 73 a driving coil spool 74 and a linear differential transformer spool 75, each of which is formed from a light, strong plastic or nylon. The driving coil spool 74 has an inner cylindrical portion 76 for alignment with the metering rod 68 and an outer cylindrical portion 77, projecting into the annular air gap 62 and carrying a driving coil 78.

The linear differential transformer spool 75 has wound thereon a primary coil 79 flanked by secondary coils 80 and 81 on either side thereof. This spool 75 also has formed therein an axial bore 82. A magnetically permeable member or iron slug 83 is slidably received in the axial bore 82 and has a threaded bolt 84 attached thereto projecting axially out of the cylindrical case member 10 through the opening 16. A nut 85 is fixed to the inside of the cylindrical case member 10 around the opening 16 by welding or other means with the bolt 84 threaded therethrough. A spring 86 between the nut 85 and the linear differential transformer spool 75 biases the assembly comprising the linear differential transformer spool 75, the driving coil spool 74 and the metering rod 68 away from the nut 85 so that the metering rod 68 abuts the setscrew 37. The setscrew 37 enables the reduced diameter portion 70 to be adjusted axially relative to the fluid flow passage when the driving coil 78 is unexcited. In this embodiment the fluid flow passage is blocked in this position.

Figure 2:
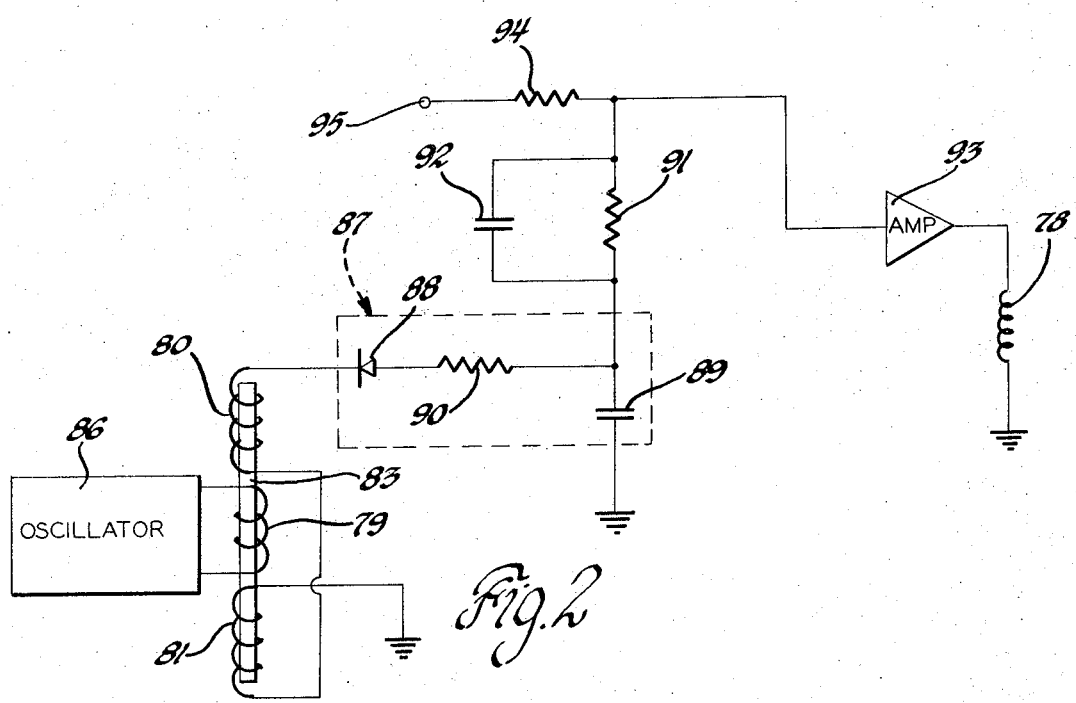
FIG. 2 shows an electric circuit for use with the valve of FIG. 1.

Referring to FIG. 2, the electrical circuitry connecting the various portions of the valve shown in FIG. 1 will be described. The primary coil 79 is connected to an oscillator which produces an AC voltage of unchanging peak amplitude. The secondary coils 80 and 81 are wound in the same direction but connected in series in opposite polarity between a rectifier 87 and ground. The rectifier 87 has a diode 88 with a cathode connected to one end of the coil 80, a capacitor 89 with one side connected to ground and a resistor 90 connected between the anode of the diode 88 and the other side of the capacitor 89.

The output of the rectifier 87, the junction between resistor 90 and capacitor 89, is connected through a resistor 91 and capacitor 92 to the input of the driving amplifier 93, the output of which is connected through the driving coil 78 to ground. Another resistor 94 has one end connected to the input of the driving amplifier 93, the other end of resistor 94 comprising a terminal 95 for the application of an external signal voltage. Capacitor 92 provides a path to ground for unwanted transient voltages in the standard manner.

The operation of the valve and circuit will now be described. The linear differential transformer spool 75, coils 79 through 81 wound thereon and iron slug 83 therein comprise a linear differential transformer. An AC voltage applied to coil 79 by the oscillator 86 causes similar AC voltages to be generated in the secondary coils 80 and 81 with magnitudes varying according to the position of coils 80 and 81 relative to the iron slug 83. Coils 80 and 81 are connected in opposite polarity so that the difference in the voltages induced therein will appear at the cathode of the diode 88. With the valve in its closed position as shown in FIG. 1, the iron slug 83 is adjusted so that it extends from approximately the center of coil 80 to approximately the center of coil 81; and the voltages induced in coils 80 and 81 cancel each other for a net voltage output of zero.

If an external signal voltage is applied to terminal 95, it causes the amplifier 93 to produce an output current through the driving coil 78 which interacts with the magnetic flux of the magnet assembly 48 to create a force pushing the metering rod assembly to the left in FIG. 1 against the spring 86. The movement of the metering rod assembly to the left pulls the reduced diameter portion 70 of the metering rod 68 into the fluid flow passage and allows a controlled fluid flow therethrough. In addition, the coils 79, 80 and 81 of the linear differential transformer are shifted to the left relative to the iron slug 83, with the result that the induced voltage in coil 81 increases, the induced voltage 80 decreases and an AC voltage is applied to the input of the rectifier 87 the amplitude of which increases linearly with the leftward movement of the metering rod assembly. The negative portion of this voltage is selected by diode 88, filtered by the resistor 90 and capacitor 89 and applied through resistor 91 to the input of amplifier 93, where it is summed with the external signal applied through resistor 94. It can be seen that, for any positive external signal voltage applied to terminal 95, the metering rod assembly will move leftward, opening the fluid flow passage, until the output of the rectifier 87 applied through the resistor 91 has increased to the point that the sum of this negative voltage and the positive external signal voltage, amplified in amplifier 93 and applied to the driving coil 78, produces a magnetic force on the metering rod assembly which balances the force of the spring 86.

In case of leakage of fluid under pressure from the inlet passage 24 along the metering rod 68 through the axial bore 22, the drain passages 30, 32 and 66 provide a path whereby said leaked fluid can be drained to the output passage 26 to prevent a pressure build up on either end of the metering rod assembly that might hamper operation of the valve.

This preferred embodiment of my invention having been described, the limits of my invention are to be defined in the following claims.

I claim:

1. A valve comprising, in combination: a case; a fluid flow passage; a bore intersecting said fluid flow passage; a rod axially movable within said bore, a portion of said rod varying axially in diameter for variation of fluid flow through said fluid flow passage with axial movement of said rod, spring means in said case biasing said rod to a first position; a magnet in said case; driving coil means fixed to said rod adjacent said magnet, said driving coil being adapted to co-act upon the application of an electric voltage thereto with said magnet against the bias of said spring means to position said rod axially in accordance with the voltage applied thereto; and a linear differential transformer in said case, said linear differential transformer comprising a magnetically permeable member fixed with respect to said case and differential coil means fixed with respect to said rod, said differential coil means having input means for the application of electric energy thereto and output means, said differential transformer being adapted to produce an output voltage at said output means upon the application of electric energy to said input means, said output voltage varying with the axial position of said rod.

2. Fluid flow control apparatus comprising, in combination: a case defining a fluid flow passage therein; a bore in said case intersecting said fluid flow passage; a rod axially reciprocable in said bore, said rod having a portion of axially varying diameter for variation of fluid flow through said fluid flow passage with the axle position of said rod; spring means in said case biasing said rod to a first position; a magnet in said case; driving coil means fixed to said rod adjacent said magnet, said driving coil means being adapted to co-act upon the application of an electric voltage thereto with said magnet against the bias of said spring and thus position said rod axially in accordance with said voltage applied thereto; a linear differential transformer in said case, said linear differential transformer comprising a magnetically permeable member fixed with respect to said case and differential coil means fixed with respect to said rod, said differential coil means having voltage input and output means; means to generate an electric voltage and apply it to said voltage input means, said linear differential transformer being adapted to produce therefrom at said voltage output means an output voltage varying in accordance with the axial position of said rod; and electric circuit means connecting said output means and said driving coil, said electric circuit means being responsive to an external signal voltage and effective to sum said output voltage as an error signal with said external signal voltage to form a position control voltage for application to said driving coil to position said rod.

3. Fluid control apparatus comprising, in combination:
  a cylindrical case member having a closed end and an open end, said cylindrical case member having a cylindrical portion adjacent said open end of greater diameter than the remainder thereof and a flange portion connecting said cylindrical portion to said remainder; said cylindrical case member also including an axial opening in the closed end thereof;
  a valve case member comprising a generally cylindrical block with an axial bore therethrough, said valve case member including a fluid inlet passage and a fluid outlet passage extending radially outward from said axial bore, said valve case member having at one end thereof a flange portion adapted to fit and be retained within the open end of said cylindrical case member;
  an end cap fixed to the unflanged end of said valve case member;
  a fluid metering rod in said axial bore, said fluid metering rod having an axial portion thereof having a diameter almost as large as said axial bore for preventing fluid flow from said fluid inlet passage to said fluid outlet passage and an axial portion thereof of reduced diameter for allowing fluid flow therearound from said fluid inlet passage to said fluid outlet passage, said fluid flow varying in quantity with the axial position of said fuel metering rod;
  a magnet assembly retained in said cylindrical portion of said cylindrical case member between said flange portion of said cylindrical case member and said flange portion of said valve case member, said magnet assembly comprising an annular permanent magnet retained axially between a pair of annular flux members, each of said annular flux members having a cylindrical portion, said cylindrical portions being coaxially aligned with each other and with said cylindrical case member to form therebetween an annular air gap, said annular flux members concentrating the flux of said permanent magnet through said annular air gap;
  a first spool member within said cylindrical case member, said first spool member being fixed to an end of said fluid metering rod for co-movement therewith, said first spool member having an inner cylindrical portion surrounding the end of said fluid metering rod for axial alignment therewith and an outer cylindrical portion projecting axially into said annular air gap;
  a second spool member within said cylindrical case member, said second spool member being fixed to said first spool member for co-movement therewith and extending axially therefrom toward said opening in said closed end of said cylindrical case member, said second spool member further having an axial bore extending therein from the end nearest said opening; said second spool member, first spool member and fluid metering rod together comprising a metering rod assembly axially reciprocable within said cylindrical and valve case members;
  a member axially adjustable in said cylindrical case member, said axially adjustable member having one end projecting through said opening for adjustment and another end projecting within said bore in said second spool member;
  a magnetically permeable member fixed to the other end of said axially adjustable member within said bore in said second spool member, said magnetically permeable member being movable axially with said axially adjustable member;
  a stop attached to said end cap and axially adjustable with respect thereto, said stop extending into said axial bore in said valve case member;
  a spring in said cylindrical case member between said closed end thereof and said second spool member, said spring biasing said metering rod assembly away from said closed end so that said fluid metering rod abuts said stop;
  a driving coil wound on said outer cylindrical portion of said first spool member in said annular air gap, said driving coil being effective, when actuated by an electrical signal, to coact with said magnet assembly and move said metering rod assembly against said spring to a position determined by said electrical signal;
  three transformer coils wound and axially spaced on said second spool member, said transformer coils and magnetically permeable member comprising a differential transformer effective, when electrically excited, to generate a signal indicative of metering rod assembly position; and
  circuit means responsive to an external signal and said metering rod assembly position signal to generate and apply said electrical signal to said driving coil.

* * * * *